United States Patent [19]

Gischlar

[11] 3,757,900
[45] Sept. 11, 1973

[54] SHOCK LIMITING AND ENERGY ABSORBING DEVICE
[75] Inventor: George M. Gischlar, Towson, Md.
[73] Assignee: Isotopes, Inc., Westwood, N.J.
[22] Filed: Oct. 22, 1971
[21] Appl. No.: 191,752

[52] U.S. Cl............................................... 188/1 C
[51] Int. Cl................................................ F16f 7/12
[58] Field of Search....................... 188/1 C; 74/492; 293/70

[56] References Cited
UNITED STATES PATENTS

| | | | |
|---|---|---|---|
| 2,857,056 | 10/1958 | Dilworth | 188/1 C X |
| 3,181,821 | 5/1965 | Eddins | 188/1 C X |
| 3,392,599 | 7/1968 | White | 188/1 C X |
| 3,582,133 | 6/1971 | DeLavenne | 188/1 C X |
| 3,628,634 | 12/1971 | Valukonis | 188/1 C |

*Primary Examiner*—Duane A. Reger
*Attorney*—Fleit, Gipple & Jacobson

[57] ABSTRACT

An improved shock limiting and energy absorbing device comprises two components arranged one inside the other. The components are prevented from freely slideably moving with respect to one another by the fact that the external diameter of the inner component is somewhat larger than the internal diameter of the outer component. Application of a force between the inner and outer components results in the inner component being moved through the outer component with the force and energy applied between the two components being absorbed and controlled by the plastic flow of the material tending to prevent the slideable movement.

11 Claims, 4 Drawing Figures

PATENTED SEP 11 1973 3,757,900

George M. Gischlar
INVENTOR

BY *Fleit, Gipple & Jacobson*
ATTORNEYS

SHOCK LIMITING AND ENERGY ABSORBING DEVICE

BACKGROUND OF THE INVENTION

This invention relates to a shock limiting and energy absorbing device.

Many types of shock absorbing and energy limiting devices are well known in the art. For example, some such devices are constructed with springs adapted to expand and contract on the application of an applied force. Some devices contain fluids adapted to absorb an applied force through the shear force encountered in the movement of the fluid. The dash pot is a well known example of this latter type of device. Other devices are pneumatic and are adapted to absorb force through the compression of a gas. Still other devices absorb shock through the sheer forces created by a moving solid material. For an example of the latter type of device, see U. S. Pat. No. 3,380,557, to Peterson, which discloses a variable kinetic energy absorber in which different materials are inserted in a plunger and extruded serially through an orifice upon the application of a force to dissipate the applied energy.

While all of these devices are capable of absorbing shock, they do not provide an accurate means for controlling or varying the amount or magnitude of the force absorbed and hence the amount of force transmitted through the device. In addition, while most of these known devices are capable of absorbing either a compressive force or a tensile force, they cannot absorb both. Also, many of these devices are composed of large, heavy and complex parts which make them unsuitable for many applications.

It is an object of this invention to provide a reliable and predictable device for limiting, controlling and varying the magnitude of an applied force as it is transmitted through the device.

It is a further object of this invention to provide a device adapted to absorb both tensile and compressive forces.

It is a still further object of this invention to provide a device adapted to absorb and transmit predetermined amounts of either compressive or tensile forces upon the application of a given applied force.

It is a still further object of this invention to provide a device capable of absorbing or transmitting compressive or tensile forces in any predetermined manner.

It is a still further object of this invention to provide a device capable of absorbing both tensile and compressive forces, which is small, light weight and of extremely simple construction.

SUMMARY OF THE INVENTION

These and other objects are accomplished according to the inventive improved shock limiting and energy absorbing device comprising two components, at least one of which is made from a material capable of undergoing plastic flow. The components are arranged one inside the other and are prevented from freely slideably moving with respect to each other by the fact that the outside diameter of the inner component is somewhat larger than the inside diameter of the outer component. When sufficient force is applied between the two components, the inner component is either pushed or drawn through the outer component with the force applied between the two components being limited and controlled by the plastic flow of the material tending to prevent slideable movement.

As a result of the unique design, the amount of energy absorbed and the force transmitted by the device can be very accurately controlled by merely varying the amount of material tending to prevent free slideable movement of the components in the direction of the slideable movement. Moreover, since the two components of the device can be adapted to slideably move both together and apart, the device can limit both compressive and tensile forces. Finally, because the device is composed of only two components either or both of which are adapted to undergo plastic deformation, the device is simple, small and lightweight.

BRIEF DESCRIPTION OF THE DRAWINGS

The nature of this invention can be better understood by reference to the following drawings wherein.

DETAILED DESCRIPTION

Figure 1:
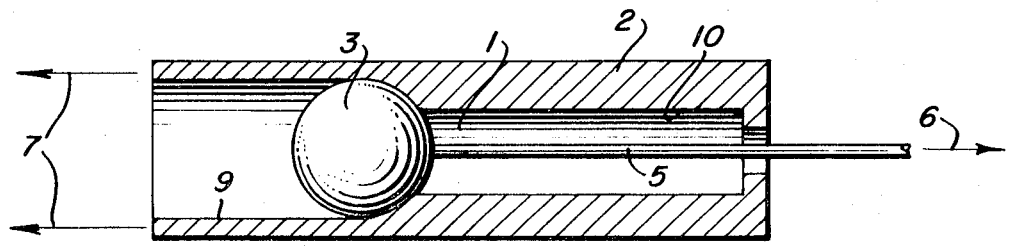
FIG. 1 is a sectional view of the improved shock limiting and energy absorbing device of this invention adapted to limit applied tensile forces.

Referring specifically to FIG. 1, the improved shock limiting and energy absorbing device of this invention is shown to comprise two parts, an inner component generally indicated at 1 and an outer component generally indicated at 2. As shown in the figure, the inner component 1 comprises a ball 3 of rigid material and a connecting link 5, while outer component 2 comprises a tube of plastic material having a larger inside diameter generally indicated at 9 to the left of ball 3 and a smaller inside diameter generally indicated at 10 to the right of ball 3. Moreover, as can clearly be seen in FIG. 1, the diameter 10 of tube 2 is smaller than the diameter of ball 3. The components are assembled as shown in the figure and a tensile force acting in the direction of arrow 6 is applied to link 5 of the inner component. This force causes ball 3 to be drawn to the right as shown in FIG. 1 through outer component 2 thus deforming outer component 2 in an amount sufficient to allow the relative slideable movement of the two components. Part of the energy from the applied tensile force is thus absorbed due to the work required to cause plastic flow of the material of tube 2 tending to prevent relative slideable movement of the two components. Part of the tensile force is transmitted through outer component 2 and is balanced by a reaction force acting in the direction of arrows 7. The magnitude of this force is limited to that magnitude required to just initiate and maintain plastic flow of the material of component 2.

Figure 2:
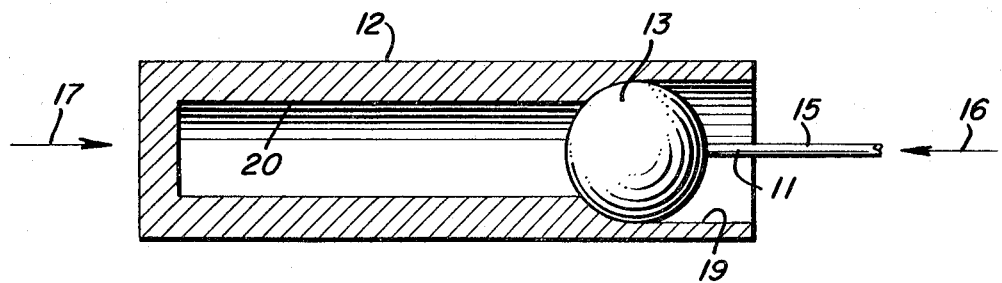
FIG. 2 is a sectional view of the improved shock limiting and energy absorbing device of this invention adapted to limit applied compressive forces.

FIG. 2 shows the improved shock limiting and energy absorbing device of this invention adapted to limit compressive forces. In this embodiment, the improved shock limiting and energy absorbing device is composed of two components, inner component 11 and outer component 12. Inner component 11 is composed of a ball 13 of rigid material and a connecting link 15. Outer component 12 is shown as being a tube of plastic material having an inside diameter 19 to the right of ball 13 larger than the diameter of ball 13 and an inside diameter 20 to the left of ball 13 smaller than the diameter of ball 13. When a compressive force acting in the direction of arrow 16 is applied to link 15, inner component 11 is pushed to the left as shown in FIG. 2 through outer component 12. This results in the plastic deformation of outer component 12 in an amount sufficient to allow the slideable movement of ball 13 to the left, and thus the absorption of part of the energy from the applied compressive force through the work necessary to cause the plastic flow of the material tending to prevent this relative slideable movement. Part of the compressive force is transmitted through outer component 12 and is balanced by a reaction force acting in the direction of arrow 17. The magnitude of this force is limited to that magnitude required to just initiate and maintain plastic flow of the material of component 12.

Figure 3:
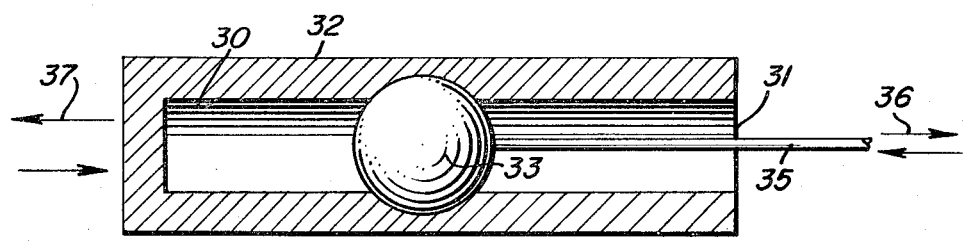
FIG. 3 is a sectional view of the improved shock limiting and energy absorbing device of this invention adapted to limit both tensile and compressive forces.

FIG. 3 shows another embodiment of this invention in which the improved shock limiting and energy absorbing device is adapted to limit both compressive and tensile forces. According to this embodiment, the improved shock limiting and energy absorbing device is composed of two components, inner component 31 and outer component 32. Inner component 31 is composed of ball 33 of rigid material and link 35, while outer component 32 is of a plastic material and has an inside diameter 30 which is smaller than the diameter of ball 33 both to right and to the left of ball 33. When a force is applied to link 35 in the direction of either of arrows 36, inside component 31 moves to the left if the force is compressive and to the right if the force is tensile. In either case, outer component 32 experiences plastic deformation in an amount sufficient to allow the movement of the ball 33, and part or all of the energy from the compressive or tensile force is absorbed through the work required to cause the plastic flow of the material preventing slideable movement of the ball through outer component 32. A resultant force having a magnitude just sufficient to initiate and maintain plastic flow of the material of component 32 developes in the direction of one of the respective arrows 37.

Figure 4:
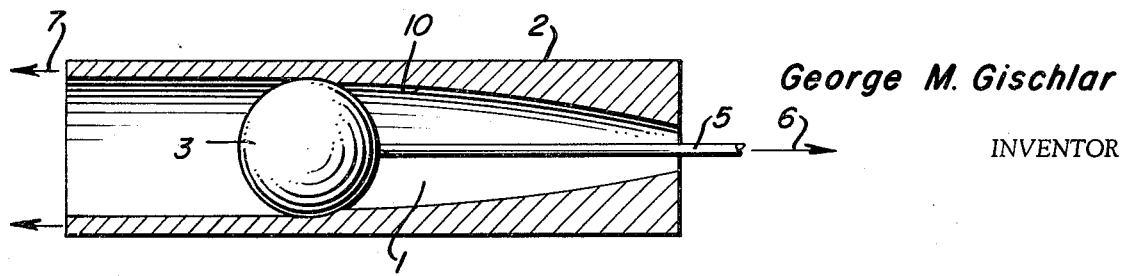
FIG. 4 is a sectional view of the improved shock limiting and energy absorbing device of this invention adapted to absorb energy at an increasing rate, and to vary the resultant tensile force as a function of displacement.

FIG. 4 shows still a further embodiment of this invention wherein the improved shock limiting and energy absorbing device is adapted to absorb energy from an applied force at an increasing rate as the relative displacement of the components increases. This shock limiting and energy absorbing device is similar in construction to the device shown in FIG. 1 except that the inside diameter 10 of the outer component 2 decreases in the direction of movement of the ball 3. As a result, when a tensile force is applied to link 5 in the direction of arrow 6 causing inner component 1 to move to the right, rigid ball 3 meets an increasing resistance to slideable movement because of the increasing amount of plastic material tending to prevent movement. Thus, the amount of energy absorbed by the device as a function of the per unit displacement of ball 3 to the right increases.

However, since there is a greater amount of material tending to prevent slideable movement as ball 3 moves to the right, the magnitude of force required to continue motion increases and hence the magnitude of force transmitted through the device increases. This is so because as ball 3 moves to the right, the removal of increasing amounts of material tending to prevent slideable movement requires an increasing expenditure of force to cause plastic flow of outer component 2 and, thus, an increasing amount of force must be applied across the device before plastic flow will occur. In other words, the quantum of force applied across the device necessary to just initiate and maintain plastic flow is greater in those areas where more material must be removed by plastic flow. Since the force applied across the article in those areas is necessarily greater, the force transmitted in those areas is necessarily greater.

Because of the unique design of the improved shock limiting and energy absorbing device of this invention, it can be designed to absorb preselected amounts of energy in a predetermined manner upon the application of a given force. As shown in FIGS. 1 to 3, the inside diameter of the outer component in the direction of the movement of the ball is relatively constant. Thus, upon the application of a force, the amount of energy absorbed is relatively constant with respect to the displacement of the components, since the amount of plastic material tending to prevent slideable movement is relatively constant. However, in the embodiment of the invention shown in FIG. 4, the nside diameter of the outer component varies across the length of the outer component. As a result, the device absorbs more energy as a function of displacement and requires an increasingly greater applied force in those areas having more material tending to prevent slideable movement, since more energy is necessary to deform the components in such areas. Thus, the improved shock and energy absorbing device of this invention can be programmed, mathematically for example, to give a predetermined response to any given amount of applied energy by merely varying the amount of plastic material in the direction of movement of the two components. For example, the device can be adapted to absorb energy and transmit forces in accordance with a ramp, sine or exponential function, or a combination of these functions or even a discontinuous function, such as a step function.

The plastic materials useful for making the improved shock limiting and energy absorbing device of this invention may be any materials which undergo plastic flow. For example, many metals as well as many plastics are known to undergo plastic flow. In addition, either the inner component or the outer component or both, may be constructed with a combination of materials having different hardnesses and thicknesses so that the amount of force absorbed and transmitted by the device may be further controlled. And while the specific embodiments have been described with reference to a rigid inner component and a plastic outer component, it should be understood that the inner component may be plastic while sliding through a rigid outer component or both components may be plastic.

The improved shock limiting and energy absorbing device has many utilities. For example, it may be inserted in the riser line of a parachute to limit opening shock forces, or it may be installed in a bumper mounting of an automobile to limit the impact forces transmitted to the vehicle. It may be installed as part of a vehicular safety belt harness to limit the magnitude of forces transmitted to the wearer and absorb impact energy. And the device can be installed in highway safety rails to absorb and limit the impact loads of automobiles. Additionally, the device can be used with cables when supporting or towing underwater or floating objects to limit the effects of underwater currents and waves. The device can also be incorporated in the landing or alighting system of a flight vehicle such as a lunar landing vehicle to absorb impact energy and limit impact forces transmitted to the vehicle. In addition, the device may be configured to accept a single force or energy application, or to accept several successive applications.

While the present invention has been described with regard to a number of particular embodiments, it should be understood that many alternate embodiments may be developed without departing from the spirit and scope of the invention. Accordingly, it should be understood that the invention is not limited to the above, but rather, is intended to be limited only as defined in the appended claims.

What is claimed is:

1. A shock limiting and energy absorbing device comprising: an outer component having an opening therein; and an inner component positioned through said opening and adapted to move relative to said outer component, in a predetermined direction and in response to the application of an external force; wherein over at least a portion of said outer and inner components at least one dimension of said inner component is greater than the corresponding dimension of said opening in a plane transverse to said predetermined direction, and wherein at least one of said inner and outer components is capable of undergoing plastic flow, said apparatus further characterized in that the difference between the length of said at least one dimension of said outer component and the length of said corresponding dimension in said opening is varied in said predetermined direction so that the device absorbs energy and limits transmitted forces in a variable manner.

2. The shock limiting and energy absorbing device of claim 1 wherein the outer component is in the form of a tube and the inner component has a cross-section substantially corresponding to the cross section of the opening in the outer component in said plane transverse to said predetermined direction.

3. The shock limiting and energy absorbing device of claim 2 wherein the outer component only is adapted to undergo plastic flow.

4. The shock limiting and energy absorbing device of claim 3 wherein the external force acts on one side of the inner component and is tensile and wherein the cross-section of the opening in the outer component is smaller than the corresponding cross-section of the inner component at least on the same side of the inner component.

5. The device of claim 1 wherein the difference between the length of said at least one dimension of said outer component and the length of said corresponding dimension in said opening increases in said predetermined direction.

6. The device of claim 2 wherein the cross-sectional areas of the outer and inner components are varied in said predetermined direction so that the device absorbs energy and limits transmitted forces in accordance with a predetermined variable mathematical function.

7. The device of claim 6 wherein said device absorbs energy and limits transmitted force in accordance with a ramp, sine, exponential or discontinuous function or a combination thereof.

8. The device of claim 6 wherein said device absorbs energy and limits transmitted forces in accordance with a ramp function.

9. The device of claim 7 wherein said device absorbs energy and limits transmitted forces in accordance with a sine function.

10. The device of claim 7 wherein said device absorbs energy and limits transmitted forces in accordance with an exponential function.

11. The device of claim 7 wherein said device absorbs energy and limits transmitted forces in accordance with a step function.

* * * * *